United States Patent Office 2,948,736
Patented Aug. 9, 1960

2,948,736

NEW ANILIDES AND PROCESS FOR THEIR PRODUCTION

Henry Martin, Zurich, Switzerland, assignor to Cilag-Chemie Aktiengesellschaft, Schaffhausen, Switzerland, a Swiss company No Drawing. Filed Aug. 5, 1957, Ser. No. 676,356

12 Claims. (Cl. 260—326.3)

The present invention relates to novel compounds useful as anaesthetics. More particularly, it relates to alkanoic acid anilides which are substituted in the 2- and 6-positions of the aniline ring, and are further substituted in the alkanoic acid portion by an amino-alkylene radical joined to the alkanoic acid hydrocarbon chain by a hetero linking radical such as oxygen, sulfur, SO, $SO_2$, NH or substituted N.

This application is a continuation-in-part of my allowed copending U.S. aplication Serial Number 515,541, filed June 14, 1955, now forfeited.

Another aspect of the present invention relates to said alkanoic acid anilides which are substituted only in the 2-position of the aniline ring, the substitutions in the alkanoic acid portion being as aforesaid.

It has been found that valuable anaesthetic properties are possessed by anilides of the general formula

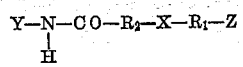
(I)

wherein Ar represents an aryl radical substituted at least in the 2- and 6-positions by a lower alkyl, a lower alkoxy or a halogen radical, $R_1$ and $R_2$ each represents a straight or branched chain alkylene radical, $R_3$ represents hydrogen, an aliphatic or araliphatic radical, X represents —O—, —S—, —SO—, —$SO_2$—, —NH— or substituted —N—, and Am represents a substituted or unsubstituted amino group.

In a broader sense, the present invention relates to anilides and acid addition salts of anilides of the type shown in Formula I wherein Ar represents an aryl radical substituted in the 2-position by a lower alkyl, lower alkoxy or halogen radical, and substituted in the 6-position by hydrogen, a lower alkyl, lower alkoxy or halogen radical; $R_1$ and $R_2$ each represents a straight or branched chain alkylene radical, $R_3$ represents hydrogen, an aliphatic or araliphatic radical; X represents —O—, —S—, —SO—, —$SO_2$—, —NH—, an N-lower alkyl, N-lower aralkyl, N-lower halogen-aralkyl or N-lower aroxyalkyl radical; and Am represents a substituted or unsubstituted amino group.

These compounds are especially suited for surface anaesthesia as well as for block anaesthesia. They are particularly characterized by the fact that increasing the concentration serves to increase the duration of the anaesthetic effect to a considerable extent. Thus, some of the compounds at a concentration of 0.5% show a duration of anaesthesia of 0 minutes, at a concentration of 1% a duration of 50 minutes, and at a concentration of 2% a duration of more than 140 minutes.

A sub-group of special utility is designated by the general formula

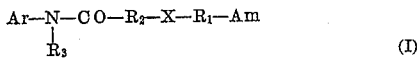
(II)

wherein X, $R_1$ and $R_2$ have their foregoing meanings, Y is a phenyl radical substituted at least in the 2- and 6-positions by a radical selected from the group consisting of the lower alkyl, lower alkoxy and halogen radicals, and Z is selected from the group consisting of alkylamino, dialkylamino and alkylene-imino radicals.

A particularly significant sub-group of compounds of the type shown in Formula II may be considered wherein $R_1$ and $R_2$ have their former meaning; Y is a phenyl radical substituted in the 2-position by a lower alkyl, lower alkoxy or halogen radical, and substituted in the 6-position by hydrogen, a lower alkyl, lower alkoxy or halogen radical; X is an N-lower alkyl radical; and Z is an alkylamino, dialkylamino or alkylene-imino radical. These compounds are only slightly toxic and are quite effective as anaesthetics when applied, for example, in minor surgery and in dentistry.

In this connection, another group of compounds which are distinguished by their strong anaesthetic action and extremely low toxicity, enabling them to be used effectively in major surgery, may be designated by Formula II wherein $R_1$ and $R_2$ have their former meaning; Y is a phenyl radical substituted only in the 2-position by a halogen radical; X is an N-lower alkyl radical; and Z is an alkylamino, dialkylamino or alkylene-imino radical.

Another group of compounds specifically directed to an —O— or —S— hetero-linkage may be designated by Formula II wherein $R_1$ and $R_2$ have their former meaning; Y is a phenyl radical substituted in the 2-position by a lower alkyl, lower alkoxy or halogen radical, and substituted in the 6-position by hydrogen, a lower alkyl, lower alkoxy or halogen radical; X is —O— or —S—; and Z is an alkyl amino, dialkylamino or alkylene-imino radical. Such compounds cause a medium local anaesthesia with little attendant toxicity which enables them to be used as infiltration anaesthetics. Moreover, these compounds may be used to combat pathogenic skin fungi such as the Trichophytons, for example, *Trichophyton mentagropytes*, *Trichophyton rubrum*, etc. on which they have an inhibitive as well as lethal effect.

Furthermore, additional compounds which may be used as very strong block anaesthetics as well as strong surface anaesthetics may be designated by Formula II wherein $R_1$ and $R_2$ have their former meaning; Y is a phenyl radical substituted in the 2-position by a lower alkyl, lower alkoxy or a halogen radical, and substituted in the 6-position by hydrogen, a lower alkyl, lower alkoxy or halogen radical; X is an N-lower aralkyl, N-lower haloaralkyl or N-lower aroxyalkyl radical; and Z is an alkylamino, dialkylamino or alkylene-imino radical. Although more toxic than the above mentioned corresponding N-alkyl hetero-linkage compounds these compounds have very strong anaesthetic action and may be effectively used with safety in dentistry.

The new compounds may especially be used in such cases where both fast action and long duration are desirable, as in major surgery, by combining them with a fast but not long lasting anaesthetic, e.g., pyrrolidino-acetic acid-(2-chloro-6-methyl)-anilide.

By way of comparison, the efficiencies and toxicities of the following compounds may be evaluated to illustrate the relative properties of the various groups of compounds of the present invention.

TABLE

| | Length of anaesthesia 1% solution in min. | Corneal anaesthesia in min. | Toxicity Sc. mg./20 g. mouse |
|---|---|---|---|
| A 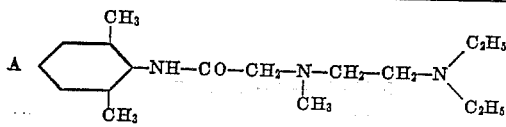 | 54 | 8 | 9.1 |
| B 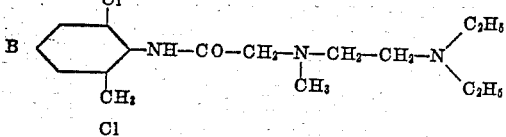 | 84 | 25 | 8.7 |
| C 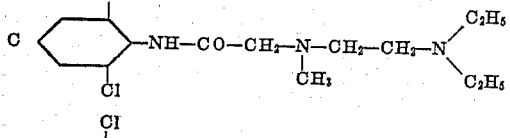 | 49.5 | uncertain | 10.1 |
| D 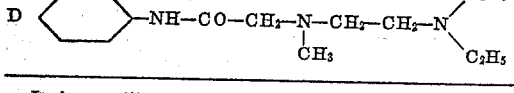 | 133! | 34 | 27.8! |

It is readily seen that compounds of the type symbolized by Formula D are especially distinguished by their low toxicity which enables them to be used more effectively in major surgery. These compounds are, for example, more than twice as efficient as compounds of the type symbolized by Formulas A and C while almost twice as efficient as compounds of the type symbolized by Formula B. It may be further noted that these compounds are approximately three times less toxic than compounds of the type symbolized by Formulas A, B and C.

The new anilides can for instance be produced by reacting compounds of the formula

(III)

or their functional equivalents with acids of this formula $$HOOC-R_2-X-R_1-Am \quad (IV)$$

or their functional equivalents according to the methods used for the formation of amides, the radicals having their aforementioned meanings.

Amines of the Formula III or their salts may therefore be reacted with acids of the Formula IV in the presence of water separating agents, such as phosphorus pentoxide, phosphorus trichloride, phosphorus pentachloride, etc. It is furthermore possible under proper conditions to react the isocyanates or carbamic acid halides to be easily produced from the anilines, the phosphazo compounds, the phosphoric or arsenic acid anilides, etc., with acids of the Formula IV.

Instead of the free acids IV, there may also be used their functional derivatives, e.g., the acid halides, the esters, the anhydrides, the mixed anhydrides, etc., for the formation of the anilides. The process described hereinabove may also be changed so as to use instead of the acids of Formula IV, acids or their reactive functional derivatives, which contain a radical capable of being easily substituted by or converted into one of the desired basic groups.

Such a radical may for instance be a halogen atom or an analogous reacting radical, e.g., an alkyl or aryl sulphonyloxy radical. These can be replaced by an amino or substituted amino group through reaction with ammonia or amines, if necessary in the presence of basic condensation agents.

Such a radical can also be for instance a carbonyl group, which is transferred into an amino or substituted amino group with the aid of ammonia or amines and reduction agents.

In this manner, valuable anilides are obtained, when 2,6-dimethylaniline, 2,4,6-trimethylaniline, 2-chloro-6-methylaniline, 2-bromo-6-methylaniline, 2,6-dichloro-4-methylaniline, 2,6-dimethoxyaniline are reacted with dimethylaminoethoxy acetic acid, dimethylaminoethoxy propionic acid, dimethylaminoethoxy butyric acid, or with the corresponding diethylamino-, dipropylamino-, dibutylamino-, pyrrolidino-, piperidino-, etc., -alkoxy compounds.

Instead of the disubstituted-amino alkoxy acids, monosubstituted-aminoalkoxy acids, such as monethylaminoethoxy acetic acid, monoethylaminopropoxy acetic acid, monobutylaminopropoxy acetic acid, etc., may also be used.

A further method of obtaining very effective anilides is to join aminoalkylmercapto acids, aminoalkylsulphoxy acids, aminoalkylsulphonyl acids, or aminoalkylamino acids (instead of aminoalkoxy acids) with the aforementioned anilines, their isomers or homologs.

The aforementioned process for preparing an anilide by means of preformed acid and an aniline, can also be carried through gradually. There can thus be obtained, according to the methods described at the beginning, anilides of the formula

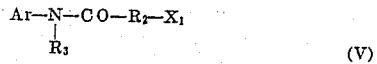

(V)

which can be further reacted with compounds of the formula $$X_2-R_1-Am \quad (VI)$$

the symbols Ar, $R_1$, $R_2$, $R_3$ and Am in both formulas having their aforementioned meanings, whereas one of the symbols $X_1$ and $X_2$ represents a reactive radical such as halogen, and the other represents one of the heteroatoms or hetero-groups having a hydrogen or other easily splittable functions, the radicals $X_1$ and $X_2$ interacting.

According to this process, there can for instance be produced a halo-alkanoic acid anilide which can then be reacted with an unsubstituted or substituted amino-alcohol or an alkali salt of same. On the other hand, there can also be produced a hydroxy-alkanoic acid anilide, which can be further reacted with an aminoalkyl-halide in the presence of basic condensation agents in order to obtain compounds of the same type.

Analogous to the methods described for the ether acids, also the thioetheracid anilides can be synthesized stepwise by reacting for instance halo-alkanoic acid anilides with substituted or unsubstituted aminoalkanethiols or their salts, or by reacting mercaptoalkanoic acid anilides with aminoalkylhalides.

With the aid of mild oxidizing agents such as $H_2O_2$ in glacial acetic acid, there may be obtained from the aminoalkylthio-alkanoic acid anilides the aminoalkylsulphoxy-alkanoic acid anilides, as well as the aminoalkylsulphonyl-alkanoic acid anilides.

The aminoalkylsulphonyl-alkanoic acid anilides may also be obtained through the reaction of aminoalkylhalides on alkanoic acid anilides containing a sulphinic acid group, or by reacting halo-alkanoic acid anilides with aminoalkylsulphinic acids or their salts.

The aminoalkylamino-alkanoic acid anilides can finally also be obtained by reacting halo-alkanoic acids with alkylenediamines, or by reacting amino-alkanoic acid anilides with aminoalkylhalides.

Thus, substituted and unsubstituted aminoalkyl-N-substituted amino-alkanoic acid anilides can be synthesized by reacting for example halo-alkanoic acid anilides with substituted or unsubstituted aminoalkyl-N-substituted amines or their salts, or by reacting N-substituted aminoalkanoic acid anilides with substituted and unsubstituted aminoalkyl-halides.

In the anilides of Formula I, one or two substituents may be introduced in the group Am, if the nitrogen thereof is unsubstituted or only singly substituted, by reacting the anilides with alkylating or aralkylating agents. As substituting agents there may be mentioned the reactive esters of alkanols, alkenols, alkinols and aralkanols, as will as the respective aldehydes or ketones used in conjunction with reducing agents.

Furthermore, if $R_3$ in the formed anilides is hydrogen, it may be substituted by alkyl-, alkenyl- or aralkyl-radicals, by reacting the anilides with hydrohalogenesters or sulphuric acid esters of alkanols, alkenols or aralkanoles. The same substitution of hydrogen by alkyl radicals and such may take place in X, if X represents the NH group.

Accordingly, when X represents a substituted-N-hetero-linkage, such substituents on the nitrogen may include alkyl, aralkyl, haloaralkyl and aroxyalkyl radicals such as methyl, ethyl, propyl, isopropyl, butyl, octyl, benzyl, substituted benzyl such as chlorobenzyl, phenoxyethyl, etc.

As mentioned before, the group Am may also be quaternary, whereby the quaternary ammonium group may be dequaternized through heating in the presence or absence of a highboiling solvent; or, if one or more of the substituents are splittable by hydrogenation (benzyl groups or substituted-benzyl groups), the quaternary ammonium group may be transformed by catalytic hydrogenation into the tertiary or secondary amino group.

The anilides of the Formula I thus formed are preferably isolated in the form of their salts with inorganic or organic acids. As inorganic acids for the formation of salts there may be used sulphuric acid, hydrochloric acid, hydrobromic acid, phosphoric acid; as organic acids, acetic acid, glycolic acid, citric acid, succinic acid, fumaric acid, maleic acid, dioxymaleic acid, methanesulphuric acid, hydroxyethane sulphuric acid, etc.

*Example 1*

350 cc. diethylaminoethanol are heated to 50–60° C. and 7.6 g. sodium dissolved therein under agitation. To this solution are slowly added 66 g. chloroacetic acid-2,6-dimethylanilide and the whole heated during 8 hours to 150–160° C. The surplus diethylaminoethanol is then distilled off and the remainder precipitated out with dilute hydrochloric acid. The insoluble parts are filtered out, the filtrate is rendered alkaline, the separated oil taken up in ether and the ether solution extracted with dilute hydrochloric acid. After filtration, the filtrate is again rendered alkaline, precipitated out with ether, and the ether dried and evaporated. The remaining oil is distilled under high vacuum. The yield is 23 g. of β-diethylaminoethoxy acetic acid-2,6-dimethylanilide, a dimly yellowy oil which boils under 0.05 mm. Hg at 142–144° C. The hydrochloride of the basic anilide melts at 143–146° C.

*Example 2*

The anilide defined in Example 1 can also be produced in the following manner:

1 mole of β-chloroethoxy acetic acid chloride is reacted with 1 mole of 2,6-dimethylaniline in acetone in the presence of potash to yield β-chloroethoxy acetic acid-2,6-dimethylanilide. The β-chloro-compound thus obtained is heated in the autoclave with 2 moles of diethylamine in benzene. After filtration of the diethylaminohydrochloride formed in the course of the reaction, the benzene solution is evaporated under vacuum and the remainder treated as defined in Example 1.

*Example 3*

55 g. chloro-acetic acid-(2-chloro-6-methyl)-anilide are heated during 24 hours to 150–160° C. with 250 cc. diethylaminoethanol containing 6 g. diluted sodium. After cooling, the mass is poured into water. The separated oil is taken up in ether, the ether solution extracted several times with diluted hydrochloric acid and the hydrochloric solution rendered alkaline. The alkaline solution is extracted with ether, the ether dried and evaporated. Under high vacuum, the residue yields an oil which boils at 135–137° C. under a pressure of 0.04 mm. Hg. This oil is easily soluble in acids and is β-diethylaminoethoxy acetic acid-(2-chloro-6-methyl)-anilide.

The hydrochloride of the base is obtained in ether with an ethereal solution of hydrochloric acid and melts at 131.5–133.5° C.

(a) In the same manner there may be obtained the β-dimethylaminoethoxy acetic acid-(2-bromo-6-methyl)-anilide which boils at 139–141° C. under a pressure of 0.05 mm. Hg.

*Example 4*

60 g. α-chloro-propionic acid-(2-chloro-6-methyl)-anilide are heated during 24 hours under agitation to 150–160° C. with 250 cc. 3-(N-pyrrolidino)-propanol containing 6 g. dilute sodium. After cooling, the mass is poured into water and the separated oil cleaned in the manner defined in Example 3 by dissolution in ether, extraction with hydrochloric acid, treatment with alkali, ethereal extraction of the alkaline hydrochloric acid solution, and distillation under high vacuum. This yields α-[3-(N-pyrrolidino)-propoxy]-propionic acid-(2-chloro-6-methyl)-anilide as a colorless oil which boils at 140–145° C. under a pressure of 0.03 mm. Hg.

*Example 5*

150 g. chloro-acetic acid-2,6-dimethylanilide are heated during 24 hours under agitation to 150–160° C. with 750 cc. 2-(N-piperidino)-ethanol containing 20 g. sodium. The isolation is the same as defined in Example 3 and yields 150–160 g. 2-(N-piperidino)-ethoxy acetic acid-2,6-dimethylanilide which boils under 0.02 mm. Hg at 130–135° C.

*Example 6*

24 g. β-chloro-ethoxy acetic acid-2,6-dimethylanilide and 25 g. n-butylamine in xylene are heated during 15 hours in an autoclave to 150° C. After cooling, the separated n-butylamine hydrochloride is filtered off, the benzene solution evaporated and the residue dissolved in dilute hydrochloric acid. The hydrochloric solution is extracted with ether, then rendered alkaline, the separated oil is taken up in ether and the ether solution dried. After distillation of the ether, the residue is distilled under high vacuum. The product is β-n-butylaminoethoxy acetic acid-2,6-dimethylanilide, which is a colorless oil boiling at 130–135° C. under 0.02 mm. Hg.

*Example 7*

β-n-Butylamino-ethoxy acetic acid-2,6-dimethylanilide of Example 6 is also obtained in the following manner:

11 g. β-amino-ethoxy acetic acid-2,6-dimethylanilide are shaken during 6 hours in the presence of Raney nickel with 4 g. n-butyraldehyde in ethanol under 2 atmospheres hydrogen pressure at 20° C. After filtration of the Raney nickel, the alcoholic solution is evaporated and the residue distilled under high vacuum.

*Example 8*

20 g. mercapto-acetic acid-(2-chloro-6-methyl)-anilide are dissolved in 200 cc. ethanol containing 2 g. sodium, the entire solution heated and then evaporated until dry. 200 cc. benzene are added to the residue, and 13 g. β-(diethylamino)-ethylchloride dissolved in 150 cc. benzene are then dropped into the suspension, which is heated during 3 hours to the boiling point and cooled. The β-(diethylamino)-ethyl-thio-acetic acid-(2-chloro-6-methyl)-anilide thus obtained is extracted from the benzene with dilute hydrochloric acid. The hydrochloric solution is rendered alkaline and the separated oil taken up in ether, which is dried and evaporated. The remainder yields, when distilled under high vacuum, β-(diethylamino)-ethyl-thio-acetic acid-(2-chloro-6-methyl)-anilide, which boils under 0.05 mm. Hg at 155–158° C.

*Example 9*

109 g. chloro-acetic acid-(2-chloro-6-methyl)-anilide and 165 g. diethylaminoethylamine in 150 cc. absolute ethanol are heated during 4 hours to 60° C. The solution is treated with steam, the aqueous solution saturated with sodium chloride and extracted with ether. The ether solution is dried and evaporated and the residue distilled under vacuum. This yields 140 g. diethylaminoethylamino-acetic acid-(2-chloro-6-methyl)-anilide, which boils under 0.11 mm. Hg. at 177° C. The dihydrochloride of the new compound melts at 202–203° C.

*Example 10*

From chloro-acetic acid-(2-chloro-6-methyl)-anilide and N-(β-aminopropyl)-pyrrolidine there is obtained β-(N-pyrrolidino)-propylamino-acetic acid-(2-chloro-6-methyl)-anilide, which boils under 0.05 mm. Hg at 159–161° C.

*Example 11*

20 g. dimethylaminoethyl-acetic acid-2,6-dimethylanilide (boiling point 0.04 mm. Hg: 140–145° C.) are dissolved in 250 cc. glacial acetic acid and reacted under stirring and cooling with 15 g. 30% hydrogen peroxide. The entire solution is stirred during 24 hours at 20° C. and then left for a few days. It is then diluted with water and rendered alkaline. The separated oil is taken up in ether, the ether dried and carefully treated with an ethereal solution of hydrochloric acid. The separating amorphous mass is precipitated from absolute alcohol/ether. This yields the hydrochloride of diethylaminoethylsulphonyl - acetic acid - 2,6 - dimethylanilide, which melts with decomposition at 210–215° C.

*Example 12*

58 g. of chloro-acetic acid-(2-chloro-6-methyl)-anilide are heated for 6 hours at boiling in 300 cc. of dioxane with 38 g. of 2-diethyl-aminoethyl-methylamine and 35 g. of sodium carbonate. Then the formed sodium chloride is filtered off and the filtrate evaporated in vacuo. The residue which is a light yellow oil is dissolved in 2 N hydrochloric acid. The acid solution is treated with acetone. Upon chilling, the formed dihydrochloride of the N-β-diethylaminoethyl-N-methylamino-acetic acid-(2-chloro-6-methyl)-anilide is filtered by suction filtration and washed with acetone. A yield of 70 g. of the dihydrochloride is obtained which melts at 206–208° C.

*Example 13*

35 g. of chloro-acetic acid-(2-chloro-6-methyl)-anilide and 25 g. of 2-diethylaminoethyl-ethylamine yield, when heated for 6 hours in 250 cc. of ethanol and 25 g. of dry sodium carbonate, 51 g. of N-β-diethylaminoethyl-N-ethylamino-acetic acid-(2-chloro-6-methyl)-anilide, which boils under 0.15 mm. Hg at 165.5–167° C. The dihydrochloride of the basic anilide in a 2% aqueous solution has a pH of 6.5.

*Example 14*

1 mol of chloro-acetic acid-(2-chloro-6-methyl)-anilide is heated for 6 hours at boiling with 1.2 mols of N-β-aminopropyl-pyrrolidine in absolute ethanol to which 0.5 mol of calcinated potassium carbonate is added. Then, the reaction mass is evaporated to dryness, the residue triturated with 2 N sodium hydroxide and extracted repeatedly with ether. After drying, the ethereal solution is evaporated and the residue distilled under high vacuum. Thus the β(N-pyrrolidino)-propylamino-acetic acid-(2-chloro-6-methyl)-anilide is obtained in a yield of 65%, which boils under 0.05 mm. Hg at 159–161° C.

*Example 15*

27.5 g. of chloro-acetic acid-(2-chloro-6-methyl)-anilide are heated with 28 g. of β-diethylaminoethylbenzylamine in 200 cc. of n-propanol in the presence of 19 g. of anhydrous sodium carbonate for 6 hours with stirring on a water bath. The solvent is then distilled off, the residue is dissolved in 2 N hydrochloric acid, the solution filtered and made alkaline. The formed anilide precipitates as an oil which is taken up in ether. The ethereal solution is then dried over potassium carbonate and evaporated. The residue, distilled under high vacuum, yields 44 g. (i.e. 76% of the theoretical) of N-β-diethylaminoethyl-N-benzylamino-acetic acid-(2-chloro-6-methyl)-anilide. The anilide thus obtained represents a colorless, acid-soluble oil, which boils under 0.06 mm. Hg at 213° C. and upon standing solidifies to coarse crystals. The dihydrochloride of the anilide in a 2% aqueous solution has a pH of 6.5.

*Example 16*

22 g. of chloro-acetic acid-(2-chloro-6-methyl)-anilide and 22 g. of γ-diethylaminopropyl-benzylamine in 100 cc. of propanol are heated for 6 hours at boiling in the presence of 10 g. of triethylamine. After cooling, the reaction mass is taken up in 2 N hydrochloric acid and the obtained solution evaporated in vacuo to one third. Then, the solution is made alkaline and the oil which precipitates is taken up in ether. After drying the ether over potassium carbonate, it is evaporated and the residue distilled under high vacuum. There are obtained 30 g. of a light yellow oil which distills under 0.06 mm. Hg at 224° C. The N-γ-diethylaminopropyl-N-benzylamino-acetic acid-(2-chloro-6-methyl)-anilide thus obtained is insoluble in water, but readily soluble in dilute acids.

*Example 17*

By reacting 200 g. of chloro-acetic acid-(2,6-dimethyl)-anilide with 205 g. of β-diethylaminoethyl-benzylamine in 750 cc. of propanol in the presence of 100 g. of triethylamine, 350 g. of N-β-diethylaminoethyl-N-benzylamino-acetic acid-(2,6-dimethyl)-anilide are obtained. The new anilide forms colorless crystals which when recrystallized from petroleum ether melt at 68–69° C.

*Example 18*

28 g. of N - n - octylamino-acetic acid-(2-chloro-6-methyl)-anilide-hydrochloride and 15.5 g. of β-diethylamino-ethyl-chloride-hydrochloride are heated for 12 to 13 hours at boiling in 200 cc. of absolute ethanol in the presence of 34 g. of sodium carbonate. After cooling, the formed sodium chloride is removed by suction filtration and the filtrate evaporated. The residue, a light yellow oil, is taken up in ether and the ethereal solution is dried. After distilling off the ether, the residue is distilled under high vacuum. A yield of 24 g. of N-β-diethylamino-ethyl-N-n-octylamino-acetic acid-(2-chloro-6-methyl)-anilide which distills under 0.06 mm. Hg at 210° C. The dihydrochloride of the basic anilide which melts at 84.5–86° C. can be prepared in ether with ethereal hydrochloric acid. It dissolves readily in cold water.

Example 19

20 g. of chloro-acetic acid-(2,6-dimethyl)-anilide and 24 g. of β-pyrrolidino-ethyl-4'-chlorobenzylamine are heated for 8 hours at boiling in 100 cc. of ethanol. The solution is then evaporated to dryness and the residue mixed with 2 N sodium hydroxide. The oil which precipitates is taken up in ether, the ethereal solution extracted with 2 N hydrochloric acid and the acid solution again made alkaline. The alkaline solution is extracted twice with ether and the combined ether extracts are dried and evaporated. The residue crystallizes upon standing to colorless crystals which melt at 118.5–120.5° C. Thus 19 g. of the N-β-pyrrolidinoethyl-N-4'-chlorobenzyl-amino-acetic acid-(2,6-dimethyl)-anilide are obtained. The dihydrochloride of the new anilide, which is readily soluble in water, melts at 188.5–190° C.

Example 20

Treated in the same manner as described in Example 19, 25 g. of chloro-acetic acid-(2-chloro-6-methyl)-anilide and 24 g. of β-pyrrolidinoethyl-4'-chlorobenzylamine in 150 cc. of toluene in the presence of 10.1 g. of triethylamine yield 20 g. of N-β-pyrrolidinoethyl-N-4'-chlorobenzyl - amino-acetic acid - (2-chloro-6-methyl)-anilide, which when recrystallized from petroleum ether melts at 98° C. The dihydrochloride of the basic anilide melts at 194–195° C.; it is readily soluble in water and ethanol while only slightly soluble in ether.

Example 21

When 16 g. of chloro-acetic acid-(2-chloro-6-methyl)-anilide are reacted with 19 g. of β-phenoxyethylamino-ethyl-diethylamine in 80 cc. of ethanol, 21 g. of N-β-diethylamino-ethyl-N-β-phenoxyethylamino-acetic acid-(2-chloro-6-methyl)-anilide are obtained. The anilide boils under 0.05 mm. Hg at 234–236° C. The dihydrochloride of the basic anilide in 2% aqueous solution has a pH of 6.5.

Example 22

From 19.7 g. of chloro-acetic acid-(2,6-dimethyl)-anilide and 24 g. of N-β-diethylaminoethyl-N-4'-chlorobenzylamine in 200 cc. of benzene, there are obtained after 8 hours heating 25 g. of N-β-diethylaminoethyl-N-4'-chlorobenzylamino-acetic acid-(2,6-dimethyl)-anilide which melts at 87–89° C. The dihydrochloride of the new anilide melts unsharply at about 100° C.

Example 23

When heating 21 g. of chloro-acetic acid-(2-chloro-6-methyl)-anilide and 24 g. of N-β-diethylaminoethyl-N-4'-chlorobenzylamine, there are obtained 26 g. of N-β-diethylaminoethyl - N-4'- chlorobenzylamino-acetic acid-(2-chloro-6-methyl)-anilide having a melting point of 80–84° C. The dihydrochloride of this anilide melts unsharply at about 100° C.

In the same manner as described in the foregoing examples there can also be obtained:

N - β - dimethylaminoethyl-N-ethylamino-acetic acid-(2,4,6-trimethyl)-anilide, B.P. 0.05 mm. Hg: 140–142° C.

N - β - dimethylaminoethyl-N-butylamino-acetic acid-(2,4,6-trimethyl)-anilide, B.P. 0.15 mm. Hg: 171–172° C.

N - β - pyrrolidinoethyl-N-benzylamino-acetic acid-(2,4,6-trimethyl)-anilide, B.P. 0.06 mm. Hg: 218–220° C.

N - β - piperidinoethyl-N-4'-chlorobenzylamino-acetic acid-(2,4,6-trimethyl)-anilide, B.P. 0.05 mm. Hg: 225–227° C.

β - (N - n - butylamino) ethoxy-acetic acid-(2,4,6-trimethyl)-anilide, B.P. 0.02 mm. Hg: 131–133° C.

β - (N - diethylamino) ethoxy-acetic acid-(2,4,6-trimethyl)-anilide, B.P. 0.05 mm. Hg: 144–145° C.

Example 24

1 mole of chloro-acetic acid-(2-chloro)-anilide and 2 moles of pyrrolidinoethyl-benzylamine are heated for 4 hours at boiling in a quadruple amount of absolute ethanol. Subsequently, the solution is treated with steam, the aqueous solution saturated with sodium chloride and then extracted with ether. The ethereal solution is evaporated after drying and the residue is distilled under high vacuum. The N-β-pyrrolidinoethyl-N-benzylamino-acetic acid-(2-chloro)-anilide is dissolved in ether and the dihydrochloride is precipitated with the aid of ethereal hydrochloric acid, representing a hygroscopic powder which melts between 178 and 180° C.

Example 25

By reacting 1 mole of methylamino-acetic acid-(2-chloro)-anilide with 1 mole of piperidino-ethylchloride in benzene in the presence of potassium carbonate, there is obtained in good yield the N-β-piperidino-ethyl-N-methylaminoacetic acid-(2-chloro)-anilide. The melting point of the dihydrochloride is 218–220° C. with decomposition. The dihydrochloride can easily be dissolved in cold water and in boiling ethanol.

Example 26

The reaction of 1 mole of α-bromo-propionic acid-(2-chloro) - anilide with β - pyrrolidinoethyl - methylamine yields the N-β-pyrrolidinoethyl-N-methyl-α-amino-propionic acid-(2-chloro)-anilide, the dihydrochloride of which melts at 167.5–170° C.

Example 27

In the same manner as described in Example 26, there is obtained the N - β - diethylaminoethyl - N - methyl-α-aminopropionic acid-(2-chloro)-anilide; its dihydrochloride melts at 157–160° C. with decomposition.

Example 28

When reacting methylamino-acetic acid-(2-chloro)-anilide with diethylamino-ethylchloride in benzene in the presence of $K_2CO_3$, there is obtained in good yield the N - β - diethylaminoethyl-N-methylamino-acetic acid-(2-chloro)-anilide. The dihydrochloride of the new anilide melts at 160–161.5° C. with decomposition.

Example 29

The reaction of chloro-acetic acid-(2-bromo)-anilide with diethylaminoethyl-methylamine yields the N-β-diethylaminoethyl-N-methylamino-acetic acid-(2-bromo)-anilide. Its dihydrochloride melts at 210–220° C. unsharply and with decomposition.

Example 30

By reacting chloro-acetic acid-(2-chloro-6-methyl)-anilide with pyrrolidinoethyl-isopropylamine, there is obtained N - β - pyrrolidino - ethyl-N-isopropylamino-acetic acid-(2-chloro-6-methyl)-anilide, the dihydrochloride of which melts at 182–186° C. with decomposition.

In analogous manner as in the foregoing examples there can be obtained:

Pyrrolidinoethyl-N-methylamino-acetic acid-(2-chloro-6-methyl)-anilide, M.P. of the dihydrochloride: 216.5–220° C. with decomposition.

N - diethylaminoethyl - N-methylamino-acetic acid-(2-chloro)-anilide, M.P. of the dihydrochloride: 160–161.5° C. with decomposition.

Pyrrolidinoethyl-N-ethylamino-acetic acid-(2-chloro)- anilide, M.P. of the dihydrochloride: 161–163° C. with decomposition.

Pyrrolidinoethyl-N-ethylamino-acetic acid-(2-bromo)-anilide, M.P. of the dihydrochloride: 180–182° C. with decomposition.

Pyrrolidinoethyl-N-methylamino-acetic acid-(2-chloro)-anilide, M.P. of the dihydrochloride: 201–203° C. with decomposition.

Piperidinoethyl-N-ethylamino-acetic acid-(2-chloro)-anilide, M.P. of the dihydrochloride: 174–177° C. with decomposition.

Pyrrolidinoethyl-N-methylamino-acetic acid-(2-chloro-5-methyl)-anilide, M.P. of the dihydrochloride: 197–198° C. with decomposition.

N-diethylaminoethyl-N-ethylamino-acetic acid-(2-chloro)-anilide, B.P. 0.1 mm.: 158° C., pH of a 2% aqueous solution of the dihydrochloride: 7.3.

N-dimethylaminoethyl-N-methylamino-acetic acid-(2-chloro)-anilide, M.P. of the dihydrochloride: 185–187° C.

N-diethylaminoethyl-N-methylamino-acetic acid-(2-methoxy)-anilide, B.P. 0.005 mm.: 145° C., pH of a 2% aqueous solution of the dihydrochloride: 7.0.

N-dimethylaminoethyl-N-ethylamino-acetic acid-(2-chloro)-anilide, B.P. 0.01 mm.: 125° C., pH of a 2% aqueous solution of the dihydrochloride: 6.9.

Pyrrolidinoethyl-N-methylamino-acetic acid-(2-methoxy)-anilide, M.P. of the dihydrochloride: 218–222° C.

β-Pyrrolidinoethyl-thio-acetic acid-(2,6-dimethyl)-anilide, B.P. 0.04 mm.: 160–161° C.

β-Piperidinoethyl-thio-acetic acid-(2,6-dimethyl)-anilide, B.P. 0.06 mm.: 165–167° C.

β-Diethylaminoethyl-thio-acetic acid-(2-chloro)-anilide, B.P. 0.04 mm.: 150–152° C.

*Example 31*

By reacting chloro-acetic acid-4-ethoxy-anilide with β-diethylaminoethylbenzylamine in ethanol in the presence of potassium carbonate, there is obtained the β-N-diethylaminoethyl-N-benzylamino-acetic acid-4-ethoxy-anilide. This forms colorless crystals, which melt at 49–50° C. and are easily soluble in 0.5 N hydrochloric acid and in boiling petroleum ether.

In analogous manner as in the aforegoing examples there can be produced:

β-N-diethylaminoethyl-N-ethylamino-acetic acid-2,4,6-trichloro-anilide, B.P. 0.03 mm. Hg: 167° C.

β-N-diethylaminoethyl-N-benzylamino-acetic acid-2,4,6-trichloro-anilide, B.P. 0.01 mm. Hg: 150–153° C.

By reacting thio-acetic acid-2,4,6-trichloro-anilide with β-diethylaminoethyl-chloride, β-pyrrolidinoethyl-chloride, β-piperidinoethylchloride, γ-dimethylaminopropylchloride, γ-diethylaminopropylchloride or γ-pyrrolidinopropylchloride and γ-piperidinopropylchloride respectively, there are obtained the fungistatically and fungicidally strongly effective β-tert.aminoethyl- and γ-tert.aminopropylmercapto-acetic acid-2,4,6-trichloroanilides. Instead of the thio-acetic acid-2,4,6-trichloro-anilides, it is also possible to react the thio-acetic acid-2,4,6-tribromo-anilide with the above mentioned tert.aminoalkylhalogenides; there are obtained approximately equally effective compounds, which, however, due to the higher price of the 2,4,6-tribromoaniline, offer no advantages over the 2,4,6-trichloroanilides.

The above mentioned aminoalkyl-mercapto-acetic acid 2,4,6-trichloro- and -tribromo-anilides respectively can also easily be obtained from the chloro-acetic acid-2,4,6-trichloroanilide and the chloro-acetic acid-2,4,6-tribromo-anilide respectively and the respective tert.aminoalkyl-thiols. Instead of the tert.aminoalkyl-thiols, there can also be used sec.aminoalkyl-thiols, such as for instance β-methylaminoethyl-thiol, β-ethylaminoethyl-thiol, β-n-butylaminoethyl-thiol, γ-ethylaminopropyl-thiol, n-butyl-aminopropyl-thiol, and others.

What is claimed is:

1. A member selected from the group consisting of amines and acid addition salts thereof, said amines having the formula

Y—NH—CO—R₂—X—R₁—Z wherein Y is a phenyl radical substituted in the 2-position by a radical selected from the group consisting of lower alkyl, lower alkoxy, chlorine and bromine radicals, and substituted in the 6-position by a radical selected from the group consisting of lower alkyl, lower alkoxy, chlorine, bromine and hydrogen radicals, $R_1$ and $R_2$ each represents a lower alkylene radical, X represents a hetero-linking radical selected from the group consisting of —O—, —S—, —NH—, >N-lower alkyl, >N-(phenyl-lower alkyl), >N-(chlorophenyl-lower alkyl), and >N-(phenoxy-lower alkyl) radicals, and Z represents a radical selected from the group consisting of lower alkylamino, di-lower alkylamino, pyrrolidino and piperidino radicals.

2. A process for the production of a compound of the formula

Y—NH—CO—R₂—X—R₁—Z wherein Y is a phenyl radical substituted in the 2-position by a radical selected from the group consisting of lower alkyl, lower alkoxy, chlorine and bromine radicals, and substituted in the 6-position by a radical selected from the group consisting of lower alkyl, lower alkoxy, chlorine, bromine and hydrogen radicals, $R_1$ and $R_3$ each represents a lower alkylene radical, X represents a hetero linking radical selected from the group consisting of —O—, —S—, —NH—, >N-lower alkyl, >N-(phenyl-lower alkyl), >N-chlorophenyl-lower alkyl), >N-(phenoxy-lower alkyl) radicals, and Z represents a radical selected from the group consisting of lower alkylamino, di-lower alkylamino, pyrrolidino and piperidino radicals which comprises heating a compound of the formula Y—NH—CO—R₂—Hal wherein Y and $R_2$ have the significance above defined, and Hal designates a halogen, in a solvent selected from the class consisting of a lower alkanol and dioxane, with a compound of the formula

V—X—R₁—Z wherein X, $R_1$ and Z have the significance above defined and V represents a member selected from the group consisting of a hydrogen atom and an alkali metal atom.

3. A compound having the formula

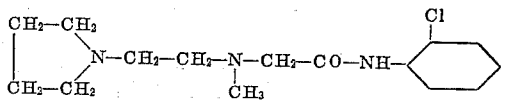

4. A compound of the formula

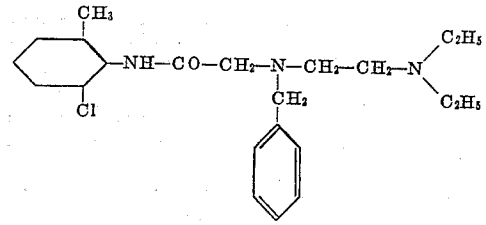

5. A compound of the formula

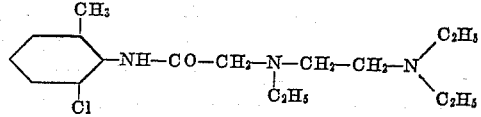

6. A compound of the formula
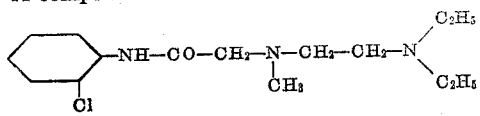
7. A compound of the formula
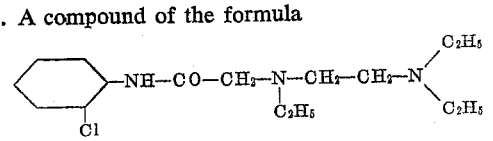
8. A compound of the formula
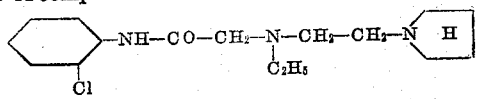
9. A compound of the formula
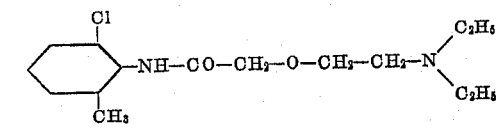
10. Amines having the formula
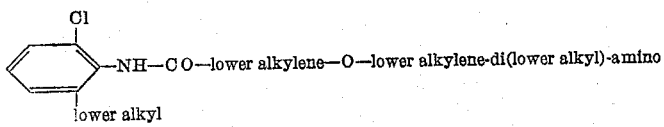
11. Amines having the formula
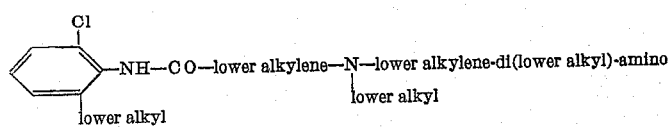
12. Amines having the formula
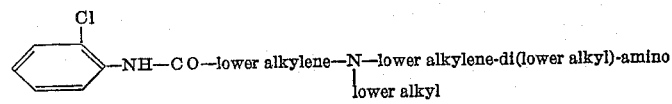
References Cited in the file of this patent
UNITED STATES PATENTS
| | | |
|---|---|---|
| 2,762,842 | Hafliger et al. | Sept. 11, 1956 |
| 2,823,209 | Martin | Feb. 11, 1958 |